(12) United States Patent
Clark (10) Patent No.: US 10,578,211 B2
(45) Date of Patent: Mar. 3, 2020

(54) HYDRAULIC DRIVETRAIN FOR A UTILITY VEHICLE

(71) Applicant: Terex South Dakota, Inc., Watertown, SD (US)

(72) Inventor: Brian M. Clark, Seattle, WA (US)

(73) Assignee: Terex South Dakota, Inc., Watertown, SD (US)

( * ) Notice: Subject to any disclaimer, the term of this patent is extended or adjusted under 35 U.S.C. 154(b) by 64 days.

(21) Appl. No.: 15/944,982

(22) Filed: Apr. 4, 2018

(65) Prior Publication Data

US 2019/0309845 A1  Oct. 10, 2019

(51) Int. Cl.
*F16H 61/456* (2010.01)
*B60K 17/10* (2006.01)
*F16H 39/02* (2006.01)
*F15B 11/10* (2006.01)
*F16H 61/4035* (2010.01)
*B60K 17/14* (2006.01)
*B66F 11/04* (2006.01)
*B66F 9/22* (2006.01)

(52) U.S. Cl.
CPC .......... *F16H 61/456* (2013.01); *B60K 17/10* (2013.01); *B60K 17/14* (2013.01); *F15B 11/10* (2013.01); *F16H 39/02* (2013.01); *F16H 61/4035* (2013.01); *B66F 9/22* (2013.01); *B66F 11/04* (2013.01)

(58) Field of Classification Search
CPC ...... B60K 17/10; B60K 17/14; B60K 17/356; F16H 39/02; F16H 61/4035; F16H 61/456

USPC .................... 60/484, 486, 487; 180/306, 308
See application file for complete search history.

(56) References Cited

U.S. PATENT DOCUMENTS

| 3,641,765 | A | * | 2/1972 | Hancock | B62D 11/183 |
| | | | | | 180/308 |
| 3,841,423 | A | * | 10/1974 | Holtkamp | B66F 9/07509 |
| | | | | | 180/307 |
| 3,910,369 | A | | 10/1975 | Chichester et al. | |
| 3,916,625 | A | | 11/1975 | Holtkamp | |
| 5,823,284 | A | | 10/1998 | Hoar et al. | |
| 2007/0235233 | A1 | | 10/2007 | Caldwell | |
| 2013/0087411 | A1 | | 4/2013 | Shade | |

OTHER PUBLICATIONS

International Search Report and Written Opinion for Application No. PCT/US2019/022969, dated May 31, 2019, 11 pages.

* cited by examiner

*Primary Examiner* — Michael Leslie
(74) *Attorney, Agent, or Firm* — Brooks Kushman P.C.

(57) ABSTRACT

A vehicle and a hydraulic propulsion system for the vehicle are provided with first and second motors diagonally arranged relative to one another on the vehicle, and third and fourth motors diagonally arranged relative to one another on the vehicle. First, second and third flow divider combiner assemblies are provided and are arranged in a closed fluid loop with the motors. A first port of each of the assemblies are fluidly connected to one another. The first assembly has a second port fluidly coupled to the first and second motors, and a third port fluidly coupled to the third and fourth motors. The second assembly has second and third ports fluidly coupled to the first and third motors, respectively. The third assembly has second and third ports fluidly coupled to the second and fourth motors, respectively. A method of controlling the hydraulic system is also provided.

18 Claims, 5 Drawing Sheets

HYDRAULIC DRIVETRAIN FOR A UTILITY VEHICLE

TECHNICAL FIELD

Various embodiments relate to hydraulic systems for a utility vehicle with a hydraulic traction circuit to control traction through a vehicle turn.

BACKGROUND

Utility vehicles used in a commercial or industrial environment may include lift equipment, including portable material lifts, telehandlers, scissor lifts, telescopic and articulating booms. These vehicles typically have a hydraulic system that acts to propel the vehicle and operate the work function, such as a lift platform, of the vehicle. The hydraulic system drives the vehicle by controlling the vehicle propulsion, vehicle braking, and vehicle steering. One or more pumps of the hydraulic system are typically driven by an internal combustion engine or other prime mover in the vehicle.

These vehicles often are provided with four-wheel drive, with hydraulic motors providing torque to drive the wheels to provide traction for the vehicle and to propel the vehicle. In a conventional system, the hydraulic traction system or traction circuit divides the fluid flow from the pump and sends one portion to the hydraulic motors associated with the front wheels and front axle and another portion to the hydraulic motors associated with the rear wheels and rear axle. This provides generally equal flow to the hydraulic motors with the motors and wheels turning at the same speed, regardless of the steer angle of the vehicle. During a turn, the vehicle wheels need to turn at different speeds based on their location on the vehicle, and the conventional front/rear split in the hydraulic traction circuit leads to inefficiencies in the hydraulic circuit and in the vehicle as one or more wheels may lose traction and slip or skid in a turn.

SUMMARY

In an embodiment, a vehicle is provided with a chassis having first and second opposite sides extending between third and fourth opposite sides, first and second wheels cooperating to provide a first pair of wheels positioned along the first side of the chassis, and third and fourth wheels cooperating to provide a second pair of wheels positioned along the second side of the chassis. The third wheel is arranged diagonally relative to the first wheel on the chassis, and the fourth wheel is arranged diagonally relative to the second wheel on the chassis. The vehicle has a closed loop hydraulic system with a pump, and first, second, third, and fourth hydraulic motors drivingly connected to the first, second, third, and fourth wheels, respectively, to rotate the associated wheel. The hydraulic system has a first flow divider-combiner assembly with a first port fluidly connected to the pump, a second port fluidly connected to the first and third hydraulic motors, and a third port fluidly connected to the second and fourth hydraulic motors. A second flow divider-combiner assembly in the hydraulic system has a first port fluidly connected to the pump, a second port fluidly connected to the first hydraulic motor, and a third port fluidly connected to the second hydraulic motor. A third flow divider-combiner assembly in the hydraulic system has a first port fluidly connected to the pump, a second port fluidly connected to the third hydraulic motor, and a third port fluidly connected to the fourth hydraulic motor.

In another embodiment, a hydraulic propulsion system for a vehicle is provided with first, second, third, and fourth hydraulic motors. The first and second motors are configured to be diagonally arranged relative to one another on the vehicle, and the third and fourth motors are configured to be diagonally arranged relative to one another on the vehicle. A first flow divider-combiner assembly has a first port, a second port configured to be fluidly coupled to the first and second hydraulic motors, and a third port configured to be fluidly coupled to the third and fourth hydraulic motors. A second flow divider-combiner assembly has a first port, a second port configured to be fluidly coupled to the first motor and a third port configured to be fluidly coupled to the third motor. A third flow divider-combiner assembly has a first port, a second port configured to be fluidly coupled to the second motor and a third port configured to be fluidly coupled to the fourth motor. The first port of the first assembly, the first port of the second assembly, and the first port of the third assembly are configured to be fluidly connected to one another. The first assembly, the second assembly, the third assembly, and the first, second, third, and fourth hydraulic motors are configured to be arranged in a closed fluid loop.

In yet another embodiment, a method of operating a hydraulic propulsion system for a vehicle is provided. Fluid flow from at least one pump is divided such that a first portion of the fluid flow is directed from the at least one pump to first and second hydraulic motors and a second portion of the fluid flow is directed from the at least one pump to third and fourth hydraulic motors. First and second wheels connected to the first and second hydraulic motors, respectively, are rotated using the first portion of the fluid flow. Third and fourth wheels connected to the third and fourth hydraulic motors, respectively, are rotated using the second portion of the fluid flow. Fluid flows from the first and third hydraulic motors are combined to the at least one pump. Fluid flows from the second and fourth hydraulic motors are combined to the at least one pump.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 4:
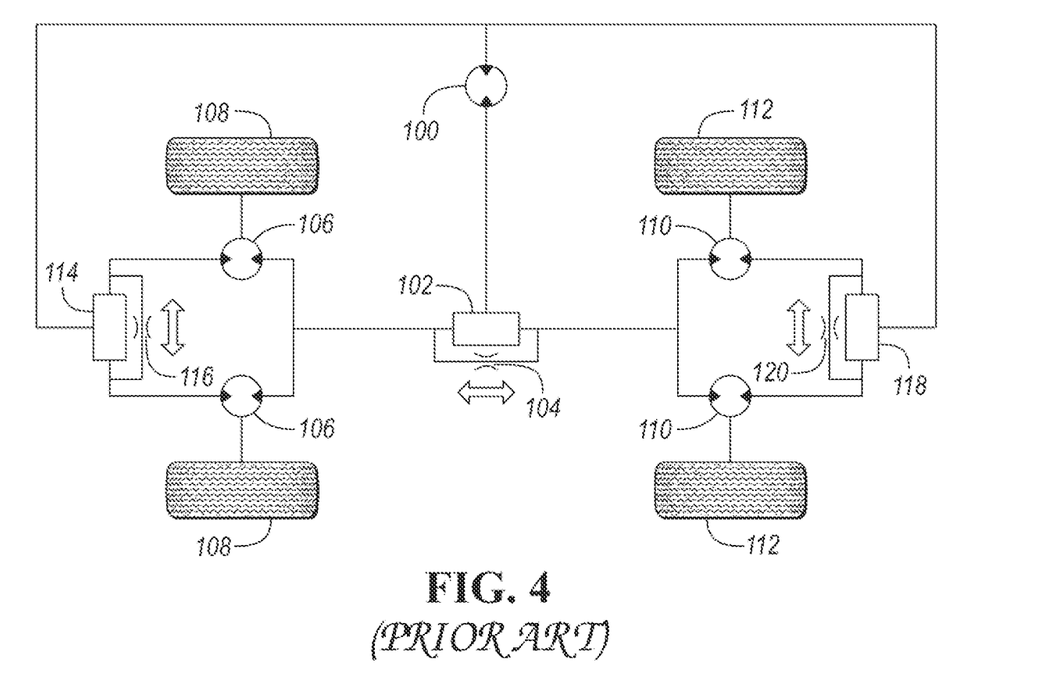
FIG. 4 is a hydraulic traction system schematic for a conventional utility vehicle.
Figure 5:
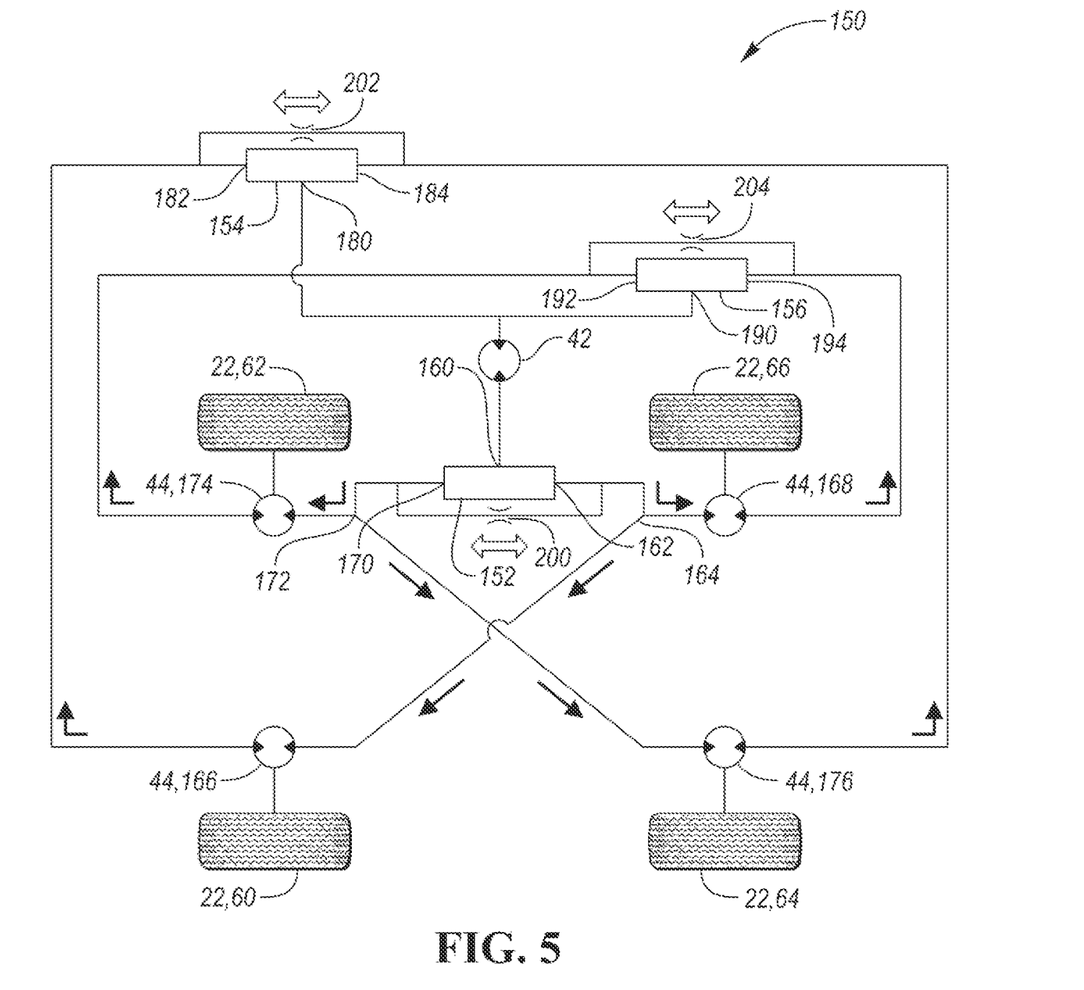
FIG. 5 is a hydraulic traction system schematic for the utility vehicle of FIG. 1.

In various embodiments, a hydraulic system and hydraulic traction circuit are provided for a utility vehicle. The hydraulic traction circuit distributes hydraulic fluid flow to hydraulic motors associated with four wheels of the vehicle to create drive torque to move the vehicle over terrain. The vehicle is therefore four-wheel drive. The fluid flow from a pump is divided to the four hydraulic motors to provide controlled flow to each of the motors such that the associated wheels are rotated at a desired, controlled speed that varies with vehicle steer angle and wheel slip and skid is prevented or reduced. The hydraulic circuit also uses flow divider-combiner valves to divide flows to different pairs of hydraulic motors or individual motors, and also recombine flows from different hydraulic motors or pairs of motors. The flow divider-combiner valves maintain traction for the grounded wheels when one or more wheels lifts off the ground or loses traction by preventing overspeed or runaway of the lifted or slipping wheel. The flow divider-combiner valves, as described later below with reference to FIGS. 4 and 5 are typically configured as 50/50 valves where the fluid flow is divided into a 50/50 split, or recombined into a flow with 50% coming from each flow input into the valve. In other examples, the valves may be provided and configured for other percentage splits.

Figure 1:
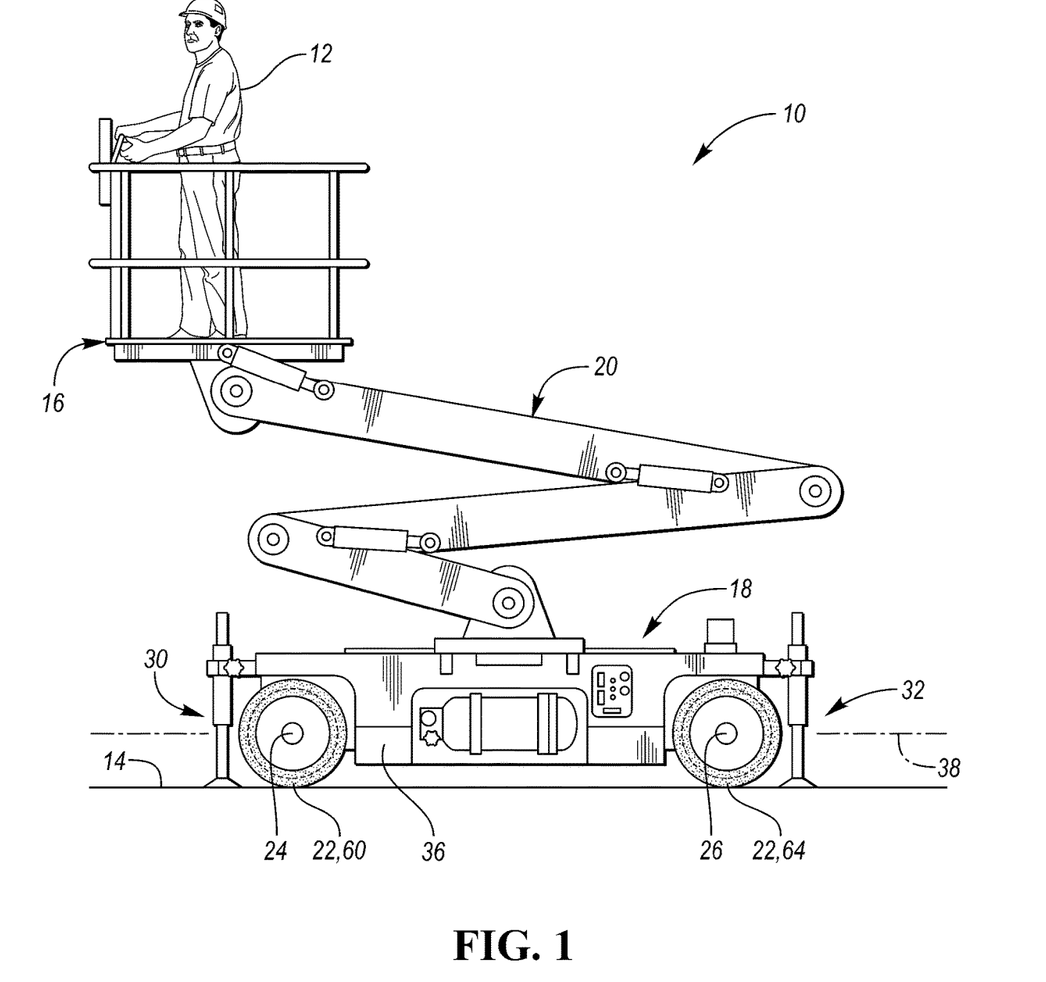
FIG. 1 is a schematic of a side view of a utility vehicle according to an embodiment.
Figure 2:
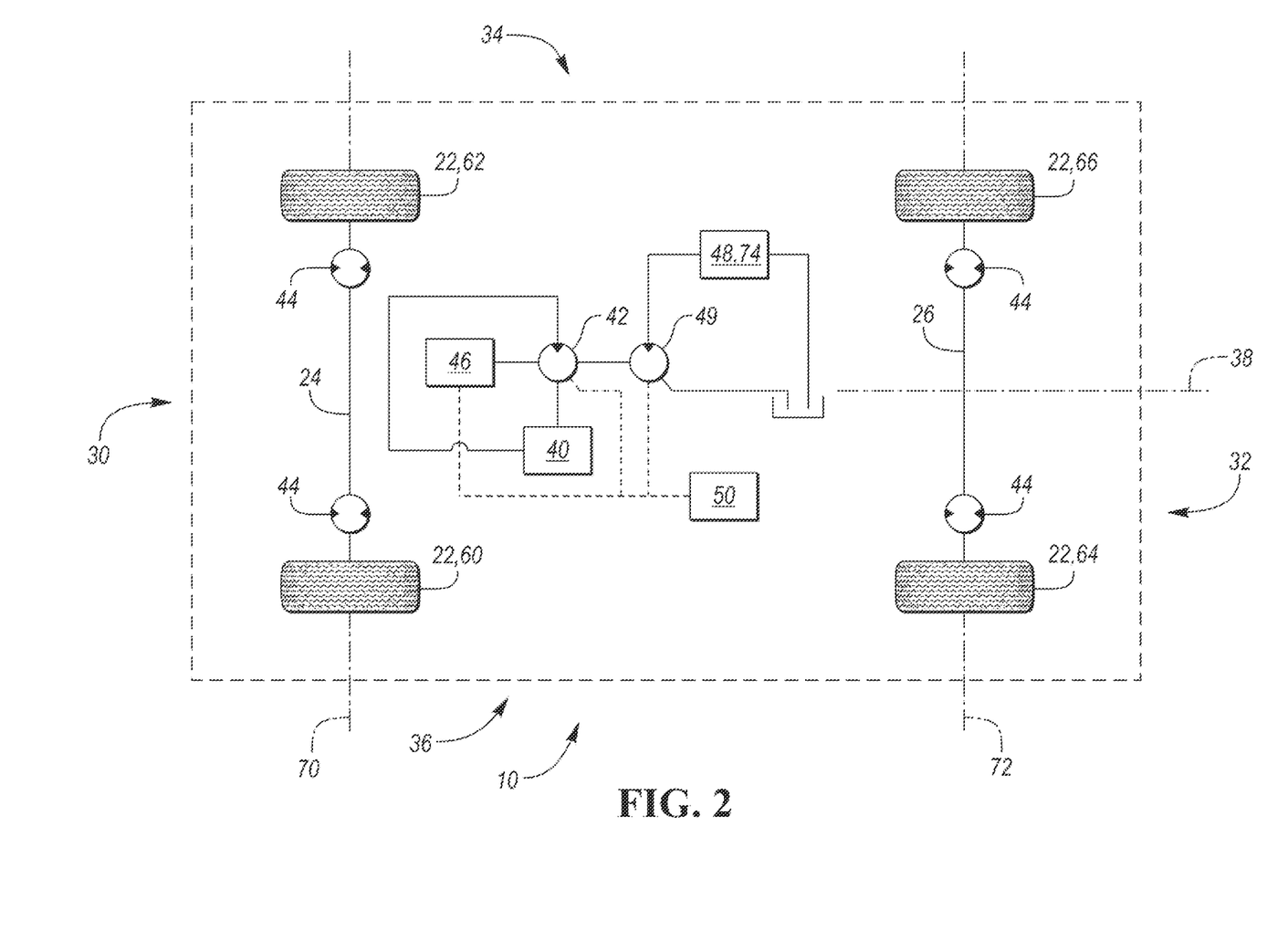
FIG. 2 is a powertrain schematic for the utility vehicle of FIG. 1.
Figure 3:
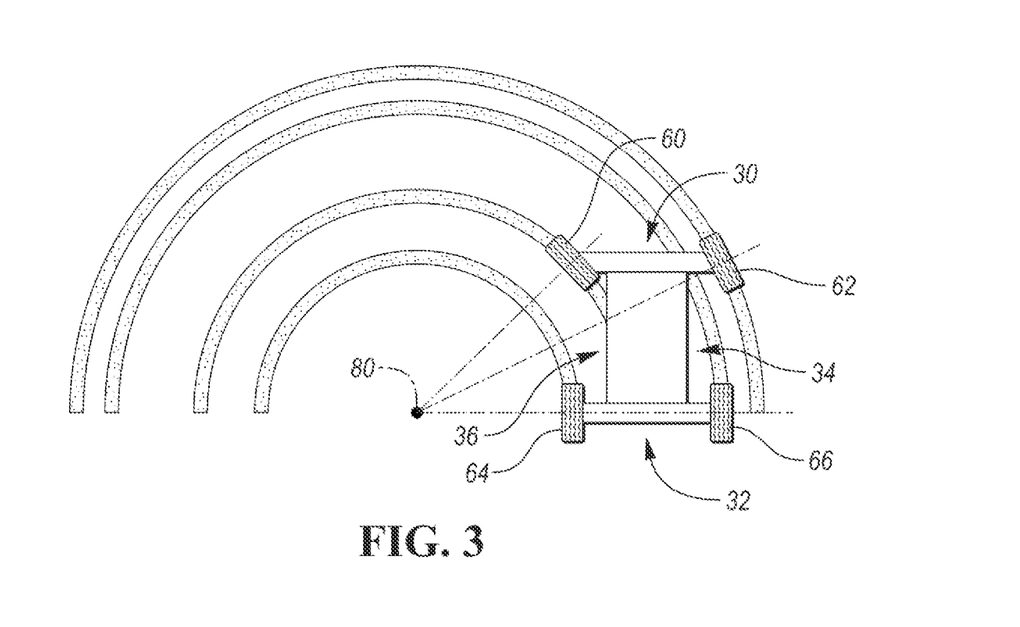
FIG. 3 is a schematic of a utility vehicle while turning.

FIGS. 1-3 illustrate a utility vehicle 10 according to an embodiment. FIG. 1 is a schematic of a side view of the vehicle 10. FIG. 2 is a powertrain schematic for the vehicle. FIG. 3 illustrates a top schematic view of the vehicle while turning based on a steering input. The vehicle 10 may be a utility vehicle such as an aerial work platform, a rough terrain telescopic load handler, portable material lift, telehandler, scissor lift, telescopic and articulating boom, and the like. The vehicle 10 is configured for lifting a load 12, such as a person, tools, cargo, and the like, with respect to a support surface 14, such as paved or unpaved ground, a road, an apron such as a sidewalk or parking lot, an interior or exterior floor of a structure, or other surfaces. The vehicle 10 may be any other vehicle that is a conventional vehicle with a hydraulic powertrain.

The vehicle 10 includes a vehicle lift component 16 such as a platform, a chassis 18, and a support assembly 20 that couples the platform 16 and the chassis 18. The chassis 18 is supported on the support surface 14 by traction devices 22, such as wheels. The traction devices 22 may include tires and/or tracks. The vehicle 10 has a first axle 24 with two wheels 22 and a second axle 26 with another two wheels 22. Axle 24 may be a front axle, and axle 26 may be a rear axle. In other embodiments, the vehicle 10 may have more than two axles. In other embodiments, traction devices 22 may be aligned with one another along a lateral axis of the vehicle, but not have axles 24, 26 extending between them.

The chassis 18 has first and second opposite sides or ends 30, 32, and third and fourth opposite sides or ends 34, 36 that extend between the first and second sides 30, 32. In one example, the first and second sides 30, 32 correspond to the front and the rear ends of the chassis and vehicle, respectively. The third and the fourth sides 34, 36 correspond to the right- and left-hand sides of the chassis and vehicle, respectively. The vehicle 10 is configured to move in both a forward and a reverse direction, e.g. in either direction along a vehicle longitudinal axis 38 when the wheels 22 are unsteered.

The traction devices 22 are each hydraulically driven using a hydraulic system 40. The hydraulic system 40 or traction circuit 40 may be a closed loop system as described herein and shown in greater detail with reference to FIG. 5. A pump 42 provides pressurized fluid to hydraulic motors 44 or other features, and the fluid then returns directly to the pump inlet while remaining pressurized. In other examples, the hydraulic system 40 may be provided as an open loop system with fluid returning to a reservoir or tank via an open return path. The pump 42 may be a load sensing pump, variable displacement hydraulic pump or other suitable pump.

The vehicle 10 has an engine 46 or other prime mover to operate the hydraulic system 40. The engine 46 may be a diesel engine, or another internal combustion engine. In other examples, an electric machine or motor may replace or augment the engine 46 in the system. The output shaft of the engine 46 may be directly and permanently fixed to the drive shaft of the pump 42 to rotate and power the pump 42, and the pump 42 may include a swash plate or other mechanism to control the flow output and flow direction from the pump. In other embodiments, a clutch, gearing, or other transmission mechanisms may be provided between the engine 46 output shaft and the drive shaft of the pump 42 to control the pump speed relative to the engine speed.

Each hydraulic drive motor 44 uses pressurized fluid to produce torque and rotate a respective traction device 22. For the vehicle 10 shown with four wheels 22, the vehicle has four hydraulic motors 44 with each motor 44 associated with a respective traction device 22 such that the vehicle is four-wheel drive. In one example, the hydraulic motors 44 have first and second displacements, or dual displacements, to provide different vehicle traction modes. For example, each motor may have a drive mode or high-speed mode with low torque and higher fluid pressures, and a low mode with higher torque and lower fluid pressures. The motors 44 may be shiftable, for example, using a swash plate with a shiftable angle, and be controlled using a pilot line and shift piston or the like. In other examples, the hydraulic motors 44 may each be single displacement or fixed displacement.

The vehicle 10 may also include a hydraulic system to provide pressurized fluid to a function circuit and manifold 48. In one example, the function manifold 48 is driven by a pump 49 that is rotatably connected or piggy-backed to the pump 42. In another example, the pump 49 is separately driven by the engine or other prime mover in the vehicle. The function manifold 48 may be provided as a closed loop or open loop system. The function manifold 48 operates the lift or work function(s) of the vehicle 10 and other hydraulic functions that the vehicle is equipped with such as hydraulic steering, hydraulic braking, and the like.

The systems 40, 48 and engine 46 are controlled by a controller 50 that is in communication with the various components of the systems and system sensors, such as a pump pressure sensor. The controller 50 may provide or be a part of a vehicle systems controller (VSC), and may include any number of controllers, and may be integrated into a single controller, or have various modules. Some or all of the controllers may be connected by a controller area network (CAN) or other system. The controller 50 may also be connected to random access memory or another data storage system.

In FIG. 2, the vehicle has wheels 60, 62, 64, 66 to provide the traction devices 22. Two of the wheels 60, 62 are aligned along a first lateral axis of the vehicle 70, which may correspond with axle 24, to provide a front pair of wheels. The other two wheels 64, 66 are aligned along a second lateral axis of the vehicle, which may correspond with axle 26, to provide a rear pair of wheels. The vehicle has two wheels 60, 62 providing a pair of wheels positioned along the front side of the chassis, and two wheels 64, 66 providing a pair of wheels positioned along the rear side of the chassis. The vehicle also has two wheels 60, 64 providing a pair of wheels positioned along the left side of the chassis, and two wheels 62, 66 providing a pair of wheels positioned along the right side of the chassis.

The function manifold 48 provides hydraulic fluid to control actuators to steer the traction devices 22. In one example, wheels 60, 62 are connected to one or more hydraulic actuators 74 to control the angle of the wheels relative to the chassis and steer the vehicle while wheels 64, 66 are unsteerable such that the vehicle is a two-wheel steering vehicle. In another example of a two-wheel steering vehicle, wheels 64, 66 may be connected to the hydraulic actuator(s) for steering while the wheels 60, 62 are unsteerable. In a further example, all four wheels 60, 62, 64, 66 are connected to one or more hydraulic actuators 74 to control the angle of the wheels relative to the chassis and steer the vehicle 10 such that the vehicle is a four-wheel steering vehicle.

FIG. 3 illustrates a two-wheel steering, four-wheel drive vehicle such as vehicle 10. The vehicle 10 is turning or steering, the steer angles of the steerable wheels 60, 62 are such that the axes of rotation for each of the four wheels 60, 62, 64, 66 coincide or intersect at a single point 80 defining the center of turn radius. This steering configuration and concept is also known as Ackerman steering. A four-wheel steering, four-wheel drive vehicle may also be configured similarly for an Ackerman steering scenario. In Ackerman steering situations, the radius from the center of turn 80 to the center of each wheel 60, 62, 64, 66 is directly proportional to the speed of each wheel 60, 62, 64, 66. Therefore, the wheels that are farther away from the center of the turn 80 need to turn faster than wheels that are closer to the center of the turn 80, as the distance that they need to travel is greater. The projected path of each wheel is illustrated in FIG. 3 for reference.

In Ackerman steering and in the present disclosure, the geometry is such that a sum of the turn radii of left rear and right front wheels 64, 62 is very similar to the sum of the turn radii of the right rear and left front wheels 66, 60, the difference not exceeding 5% in a typical application and vehicle configuration. In other words, sum of the turn radii of each pair of diagonally opposed wheels, e.g. wheels 60, 66 and wheels 62, 64, is substantially similar and typically within 10% or even 5% of each other.

In a conventional vehicle with a hydraulic traction circuit, and as shown in FIG. 4, the hydraulic fluid from the pump 100 is divided equally using a flow divider-combiner valve 102 and sent separately to hydraulic motors 106 associated with the front pair of wheels 108 and hydraulic motors 110 associated with the rear pair of wheels 112. The flow from the front wheel hydraulic motors 106 is recombined equally using a flow divider-combiner valve 114 and returned and sent to the pump 100, and the flow from the rear wheel hydraulic motors 110 is recombined equally using a flow divider-combiner valve 118 and returned to the pump 100. As can be seen from the illustration in FIG. 3, a sum of the radii for the front wheels 108 is larger than a sum of the radii for the rear wheels 112 in the turn, and therefore the existing division of flow provides too much or too little flow to hydraulic motors 106, 110 in the system. Furthermore, and as shown in FIG. 3, for flow re-combinations, the inner wheels and outer wheels in a front or rear pair have vastly different radii and speeds, e.g. the left rear and right rear wheels may differ by 100% in a turn, and recombining these flows may also lead to inefficiencies in the system. In other words, while steering, the front wheels 108 have to turn faster than the rear wheels 112, and the wheels at the outside of the turn have to turn faster than the wheels on the inside of the turn. When driving straight, the flow divider-combiner valves 102, 114, 118 allows for wheels 108, 112 with traction to apply torque while wheels 108, 112 with poor traction do not slip excessively. However, when the vehicle is turning in a tight radius, forcing all wheels 108, 112 to go the same speed based on the hydraulic circuit arrangement of the flow divider-combiner valves 102, 114, 118 causes the wheels at different speeds to fight each other and waste power. In a conventional vehicle, a certain amount of unequal flow to the wheels is allowed to account for speed differentials between motors by providing a bypass flow. The bypass flow has an orifice or flow control valve 104, 116, 120 to allow for a short cut parallel for the valves 102, 114, 118 that permits an amount of flow to bypass the flow divider-combiner valve, and allow divided flow from one side to be redirected to divided flow on the other side of the valve based on pressure differentials. However, through a turn as the speed differential and bypass flow increases, the hydraulic fluid is heated. The orifices 104, 116, 120, or another flow control valve, may be used to control bypass flow and to allow pressure to be maintained on wheels with traction; however, this bypass can only provide a limited amount of flow equalization and also leads to inefficiencies in the system.

FIG. 5 illustrates a hydraulic traction circuit 150 for use with the vehicle 10 and hydraulic system 40 of FIGS. 1-3 according to an embodiment of the present disclosure. Reference numbers in FIG. 5 are the same reference numbers in FIGS. 1-3 for elements that are the same or similar. The hydraulic circuit 150 divides flow to wheel pairs other than the front pair and the rear pair, and divides and recombines flow from different pairs of wheels on the vehicle. In one example, the hydraulic circuit divides hydraulic fluid to pairs of diagonally arranged wheels using a flow divider-combiner valve. In this arrangement, substantially half of the pump flow to the hydraulic circuit goes to one diagonal pair of motors while the remaining half goes to the other diagonal pair of motors. The flow is then recombined to the pump with the flow from the left-hand pair being recombined and the flow from the right-hand pair being recombined.

In FIG. 5, the pump 42 is rotated by the engine 46 in the vehicle. The pump 42 may be provided with a swash plate to control the direction of flow output from the pump 42, e.g. a first direction in the circuit 150 to rotate the hydraulic motors 44 in a first direction, for example a forward vehicle direction, or in a second direction in the circuit 150 to rotate the hydraulic motors 44 in a second direction, for example a reverse vehicle direction. In other examples, the pump may be provided with associated flow direction control valves to control the direction of flow in the fluid circuit.

The description as it relates to FIG. 5 below described the fluid flow in a first direction through the circuit 150; however, one of ordinary skill in the art understands that the flow may be reversed through the circuit to reverse the direction of the hydraulic motors 44 and vehicle. The flow combiner-divider valves or assemblies 152, 154, 156 therefore each operate as a divider valve with fluid flow in one direction, and as combiner valves with fluid flow through the valve in the opposite direction. Flow divider-combiner valves as used herein may include any form of a device or assembly that combines and divides fluid flow in a manner similar to that described with respect to the flow divider-combiner valves 152, 154, 156. For example, elements 152, 154 and 156 may each be provided by a spool-valve or spool-type; gear pump, rotary, or motor-type; or another flow divider-combiner device or flow divider-combiner assembly.

For a flow divider-combiner valve 152, 154, 156, as a wheel loses traction and begins to slip and the motor 44 begins to freewheel, there is a pressure drop across the flow valve instead of across the hydraulic motor associated with the wheel. The valves 152, 154, 156 may be self-controlling such that this pressure differential controls a pilot line to the valve and changes the flow split of the valve to restrict flow to the motor associated with the wheel with less traction. The flow combiner valves 152, 154, 156 may also control the flow split in the system when one of the wheels is slipping or losing traction.

The pump 42 outlet is fluidly connected to a first flow divider-combiner valve 152. The first valve has three ports. Ports as used herein may include any form of a fluid connection, including an opening or passageway provided in a separate connector device or in the component itself, for example as an aperture or drilled passage in a manifold structure.

The first port 160 is fluidly connected to the pump 42. The second port 162 is fluidly connected to a fluid line 164 for the first and third hydraulic motors 166, 168. Fluid flow in the line 164 is at a common pressure for the first and third hydraulic motors, neglecting any friction flow losses in the system, etc. The line 164 includes a fluid junction, such as a T-junction, to fluidly connect the port 162 with each of the motors 166, 168 at a common fluid pressure.

The third port 170 is fluidly connected to a fluid line 172 for the second and fourth hydraulic motors 174, 176, and fluid flow in the line is at a common pressure for the second and fourth hydraulic motors, neglecting any friction flow losses in the system, etc. The line 172 includes a fluid junction, such as a T-junction, to fluidly connect the port 170 with each of the motors 166, 168 at a common fluid pressure.

As shown in the Figure, the first and third motors 166, 168 are not associated with a common axle or along a common lateral axis such that they are diagonally arranged, and the second and fourth motors 174, 176 are not associated with a common axle or along a common lateral axis such that they are diagonally arranged. Therefore, the first and third motors 166, 168 are arranged diagonally relative to one another on the chassis and vehicle as shown, and the second and fourth motors 174, 176 are arranged diagonally relative to one another on the chassis and vehicle.

A second flow divider-combiner valve 154 is provided in the circuit 150. The second valve 154 has three ports. The first port 180 is fluidly connected to the pump 42. The second port 182 is fluidly connected to a fluid line for the first hydraulic motor 166. The third port 184 is fluidly connected to a fluid line for the fourth hydraulic motor 176. As shown in the Figure, the first and fourth motors may lie along a side of the vehicle, such as the left-hand or right-hand side of the vehicle.

A third flow divider-combiner valve 156 is provided in the circuit 150. The third valve 156 has three ports. The first port 190 is fluidly connected to the pump 42. The second port 192 is fluidly connected to a fluid line for the second hydraulic motor 174. The third port 194 is fluidly connected to a fluid line for the third hydraulic motor 168. As shown in the Figure, the second and third motors may lie along a side of the vehicle, such as the left-hand or right-hand side of the vehicle.

The pump 42, the first valve 152, the second valve 154, the third valve 156, and the first, second, third, and fourth hydraulic motors 166, 168, 174, 176 are arranged in a closed fluid loop or fluid circuit. The pump 42 is positioned between and fluidly couples the first valve 152 to the second and third valves 154, 156. As shown in FIG. 5, a fluid junction, such as a T-junction, may be used to fluidly connect the ports 180, 190 with the pump 42 such that the fluid in this section of the circuit is at a common fluid pressure.

The pump 42 and circuit 150 are configured to provide fluid flow in a first direction such that fluid flows sequentially from the pump 42 to the first valve 152 to the hydraulic motors 44 to the second and third valves 154, 156 and to the pump 42 such that each of the hydraulic motors 44 operate at a controlled speed to rotate the associated wheels. The fluid circuit is arranged such that the speed of each motor is controlled to approach a speed defined as a function of the vehicle speed and the steer angle of the wheel. Wheel torque is a function of fluid pressure at the motor, road load, requested vehicle speed and acceleration, and the like, and the wheels speeds are controlled to approach equal torque output at each wheel.

The pump 42 and circuit 150 are configured to provide fluid flow in a second direction such that fluid flows sequentially from the pump 42 to the second and third valves 154, 156 to the hydraulic motors 44 to the first valve 152 and to the pump 42 such that each of the hydraulic motors 44 at a controlled speed to rotate the associated wheels.

Each of the first, second, and third valves 152, 154, 156 are provided as 50/50 valves for dividing or recombining fluid flows to or from the second and third ports of each valve, where the fluid flow is divided into a 50/50 split, or recombined into a flow with 50% coming from each flow input into the valve or device. In other examples, the valves 152, 154, 156 may be provided with other predetermined percentages for flow division or recombination, for example, based on different wheel geometries for the vehicle. In further examples, the valves 152, 154, 156 may be controllable to vary the percentages for flow division and recombination, for example, to further reduce or eliminate bypass flow in the associated orifices 200, 202, 204.

For example, the circuit and vehicle may be configured to non-equal gear ratios or different gear ratios between the front and rear axles, or between the front wheels 60, 62 and rear wheels 64, 66. In one example, the front axle wheel 60, 62 drives may use a higher gear ratio than the rear wheel 64, 66 drives, because the vehicle weight distribution permits more tractive force to be applied on the higher loaded front axle associated with wheels 60, 62. In this case, the front motors 166, 174 would need to spin faster than the rear motors 168, 176 such that the four wheels 22 turn at the same speed as one another. For the case where all four motors 44 have the same displacement, the front motors 166, 174 would need more fluid flow than the rear motors 168, 176. As the diagonal pairs of motors are each hydraulically connected by a respective open fluid junction 164, 172, e.g. a T-junction, the flow division occurs automatically. The flow divider-combiner devices 154, 156 are used to constrain the flow to the desired predetermined percentages for flow division or recombination from the front and rear pairs of motors 44, and the devices 154, 156 are constrained to divide and combine at a non-equal ratio, e.g. other than 50/50. If the vehicle and gearing is configured such that the front axle provide 70% of the torque and the rear axle provides 30% of the torque, the flow divider-combiner devices 154, 156 are set to use that ratio for flow division or control while the flow divider-combiner device 152 to the diagonal pairs of motors may remain as a 50/50 valve. For example, the valve 154 may be set to combine a fluid flow with 70% of the flow through port 182 and 30% of the flow through port 184, and the valve 156 may be set to combine a fluid flow with 70% of the flow through port 192 and 30% of the flow through port 194.

The exact same effect can be achieved by keeping the gear ratios the same for each wheel, and using different displacement motors on the front and rear axles. Again, the divider/combiner ratio for the front/rear would need to match the ratio of displacements.

The second and third valves 154, 156 are arranged for parallel fluid flow to or from the pump 42 based on the flow direction in the circuit 150. Each of the first, second, and third valves 152, 154, 156 has an associated bypass device 200, 202, 204 fluidly coupling the second and third ports to allow flow from the second port to flow to the third port, or vice versa, based on any pressure imbalances between the second and third ports and associated fluid lines. Each bypass device 200, 202, 204 may be a valve or an orifice. As the fluid flow in the present disclosure is controlled to reduce wheel speed differentials as the vehicle is steered, less fluid flows through the bypass devices and more tractive effort is available at the wheels to propel the vehicle.

During operation, fluid flow from the pump 42 is divided by the first valve 152 such that a first portion of the fluid flow is directed from the pump 42 to a first pair of hydraulic motors 166, 168 and a second portion of the fluid flow is directed from the pump 42 to a second pair of hydraulic motors 174, 176. The fluid flow may be divided using the first valve 152 positioned downstream of the pump. The two wheels 60, 66 connected to the first pair of hydraulic motors 166, 168, respectively, are rotated using the first portion of the fluid flow. The two other wheels 62, 64 connected to the second pair of hydraulic motors 174, 176, respectively, are rotated using the second portion of the fluid flow. Flow from one of the motors in each of the first and second pairs are combined and returned to the pump, and these motors 166, 176 may be positioned and recombined as pairs on one side of the vehicle such as the left-hand side. Flow from the other one of the motors in each of the first and second pairs are combined and returned to the pump, and these motors 174, 168 may be positioned and recombined as pairs on one side of the vehicle such as the right-hand side. Motors in each pair of motors may be positioned diagonally relative to one another on the vehicle.

As shown in FIG. 5, first and second wheels 60, 62 on a first axle are connected to first and second hydraulic motors 166, 174, respectively. Third and fourth wheels 64, 66 on a second axle are connected to third and fourth motors 168, 176, respectively. The pump 42 is fluidly connected to the first and third motors 166, 168 via a flow divider valve 152 to direct a first portion of fluid flow received by the valve from the pump to the first and third motors. The pump 42 is also fluidly connected to the second and fourth motors 174, 176 via the flow divider valve 152 to direct a second portion of fluid flow received by the valve from the pump to the second and fourth motors.

In various examples, the hydraulic circuit divides hydraulic fluid to motors associated with pairs of wheels arranged on the left-hand side or the right-hand side of the vehicle, and recombines hydraulic fluid from motors associated with pairs of wheels arranged diagonally.

For flow re-combinations and as shown in FIG. 3, the inner wheels have a similar, short turn radius and the outer wheels have a similar, long turn radius. Therefore, the fluid flows from the hydraulic motors on the left side are recombined with one flow combiner-divider valve, and flows from the hydraulic motors on the right side are recombined with another flow combiner-divider valve. This results in much smaller flow differences between input flows into each of these flow divider-combiner valves than if re-combining flows from the rear wheel motor pair and re-combining flows from the front wheel motor pair as is conventionally done.

Additionally, the divided flows and the recombined flows are associated with different pairs of hydraulic motors which handles additional degrees of freedom and provides an improved result compared to dividing and combining flows to and from the same hydraulic motors, as shown in FIG. 4.

The hydraulic traction circuit 150 in FIG. 5 provides a similar level of performance when the vehicle is driving straight ahead, with or without effective traction, as the system shown in FIG. 4. However, the hydraulic traction circuit 150 in FIG. 5 offers a substantial improvement over the conventional circuit when the vehicle is turning, for example, when steered to a tight turn radius, as the pressure required to maintain a given tractive force is much lower. Improvements are provided in both two- and four-wheel steer vehicles using the traction circuit of FIG. 5 compared to a conventional circuit; however, greater improvements may be generally seen in two-wheel steer vehicles as the speed differentials between the wheels is greater in turns.

In the proposed solution, a bypass device, such as a bypass orifice or a bidirectional flow control valve, is retained and provided in parallel with the flow divider, but flows across the shortcut are much smaller. The bypass device remains to correct inaccuracies and error in the flow valves, and other factors such as tire wear and inflation levels and asymmetric vehicle loading.

For example, testing results indicate that the hydraulic circuit pressures between a conventional hydraulic traction circuit and the circuit 150 according to the present disclosure and as shown in FIG. 5 are generally equivalent when the vehicle is in a straight-ahead configuration, e.g. no steering input or turning. Test data indicates that when a vehicle with the circuit 150 according to the present disclosure is in a maximum steering angle configuration, it has a drive pressure of only approximately 25% greater than when it is in a straight-ahead configuration. Conversely, when a vehicle with a conventional circuit according FIG. 4 is in a maximum steering angle configuration, it has a drive pressure of approximately 125% greater than when it is in a straight-ahead configuration. Furthermore, the conventional circuit has nearly double the drive pressure of the disclosed circuit 150 of FIG. 5 when both are in a maximum steer angle configuration. Therefore, the disclosed circuit of FIG. 5 allows for a more uniform drive pressure through varying steer angles to pairs of wheels to allow for controlled speeds, and a more equal torque distribution at the wheels.

In another example, modelling results indicate that bypass flow required during a maximum steer angle configuration for the vehicle are significantly reduced in the circuit 150 according to the present disclosure compared to a conventional circuit when both are in a maximum steer angle configuration. The flow divider-combiner valves of the conventional circuit had an average bypass flow for the circuit of over two and a half gallons per minute. The flow divider-combiner valves of the circuit 150 of FIG. 5 had an average bypass flow for the circuit of less than one gallon per minute, thereby showing a dramatic improvement in the efficiency in the hydraulic traction system.

The positioning of the divider-combiner valves in relation to the T-junctions also provides for control over the flow to each of the motors through varying steer angles and under other conditions where one or more wheels may lose traction and slip or skid. The divider-combiner valves control the flow, e.g. by creating a set or forced pressure drop in the system across the valve or by creating or retaining a back pressure, and the flow may be divided into equal flows or be combined equally based on the flow direction through the valve. In contrast, the T-junctions fluidly connect hydraulic motors at the same fluid pressures such that it is an open connection, and the motors are able to use the fluid flow as needed to rotate, which may be at different relative speeds. The T-junctions and divider-combiner valves are also arranged such that one or two wheels of the vehicle may lose traction and be in a "free-wheel" state without runaway, and the motors for the remaining wheels continue to receive pressurized fluid flow to propel the vehicle.

The circuit 150 of FIG. 5 therefore allows for a significant reduction of drive pressure in a turn compared to a conventional system, and the engine is less likely to stall in a turn, particularly when the vehicle is traversing a grade. Also, as fluid flow is distributed in a controlled manner between the pairs of hydraulic motors and wheels, the wheels are not fighting each other and so are less likely to begin slipping when traction is limited. Additionally, it may be possible to use a smaller engine with the vehicle with circuit 150, thereby providing cost and weight improvements as well as fuel economy. As the motor speeds are controlled, the resulting torque at the wheels is more balanced with the system 150 according to the present disclosure, the vehicle has a reduced tendency to disturb or tear up the ground surface in a turn. Additionally, as the fluid flow to pair of wheels is more balanced and the speeds of the motors is controlled, and the required drive pressures are lower, the hydraulic fluid undergoes less heating in the circuit 150 of FIG. 5 compared to a conventional circuit, thereby increasing the duty cycle of the vehicle, and also allowing for downsizing or removal of a hydraulic fluid cooler in the vehicle.

Figure 6:
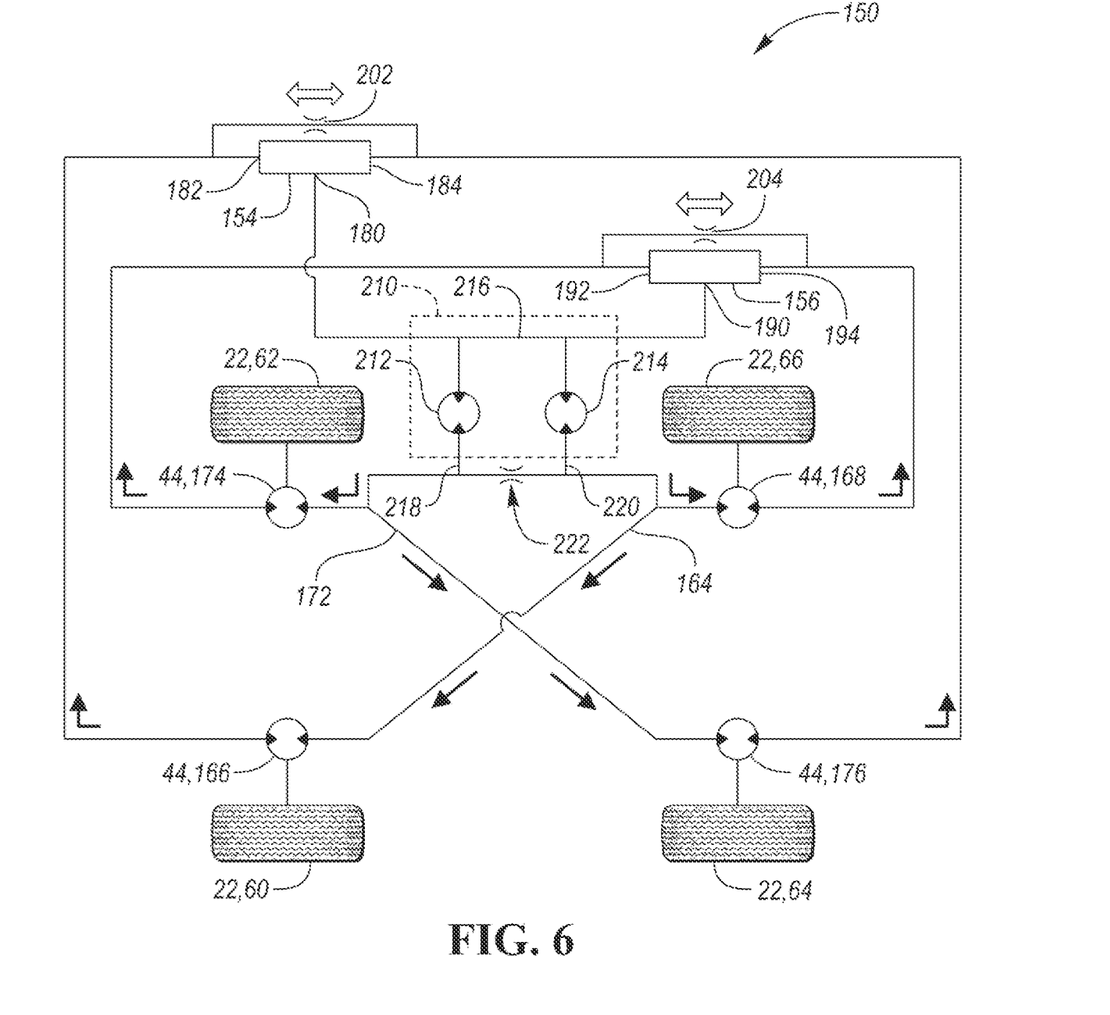
FIG. 6 illustrates another hydraulic traction system schematic for the utility vehicle of FIG. 1.

FIG. 6 illustrates a variation of the hydraulic traction circuit 150 for use with the vehicle 10 and hydraulic system 40 of FIGS. 1-3 according to another embodiment of the present disclosure. Reference numbers in FIG. 6 are the same reference numbers in FIGS. 1-4 for elements that are the same or similar. The hydraulic traction circuit 150 of FIG. 6 provides for similar flow division and recombination as that described above with reference to FIG. 5 via the use of alternative components.

In FIG. 6, two closed loop drive pumps replace the single drive pump 42 and the flow divider-combiner valve 152 in the circuit 150 of FIG. 5. In one example, a first pump 212 and a second pump 214 are provided as illustrated to pump the fluid in the circuit, and pumps 212, 214 additionally provide the function of a flow divider-combiner assembly 210. The pumps 212, 214 may be mechanically linked to one another such that they rotate at the same speed. The pumps 212, 214 share a common port 216 or fluid line on one side and have separate ports 218, 220 on the other side. For example, pump 212 is fluidly connected to ports 216 and 218, and pump 214 is fluidly connected to ports 216 and 220. The assembly 210 and pumps 212, 214 are operable to provide fluid flow in either direction, e.g. into or out of port 216 such that fluid flows in a first direction, for example a forward vehicle direction, or in a second direction in the circuit 150 to rotate the hydraulic motors 44 in a second direction, for example a reverse vehicle direction.

The ports 218, 220, or fluid lines, may be connected by a bypass device 222 such as a valve or an orifice, to allow for bypass flow between ports 218, 220 based on any pressure imbalances between the ports 218, 220 and associated fluid lines.

In one examples, the assembly 210 may be provided without a drive link to an external load or other device such that the assembly 210 operates as a standalone component in the circuit 150 and vehicle. In other examples, the pumps 212, 214 may be provided using two variable displacement pumps coupled to a single engine, or two fixed displacement pumps coupled to a single variable speed motor.

In other examples, other discrete hydraulic flow control components may be provided and arranged in the hydraulic circuit 150 in order to control the flow to each of the hydraulic motors, and for flow division and recombination, or to function similarly as the assembly 210 as described herein.

With reference to the fluid flow in the circuit being in the first direction, the assembly 210 is used to pump fluid through port 218 to one pair of diagonally arranged hydraulic motors 174, 176, and through port 220 to the other pair of diagonally arranged hydraulic motors 166, 168. The return flow from the pair of motors 166, 176 is re-combined in one flow divider-combiner device 154, and the return flow from the pair of motors 168, 174 is re-combined in another flow divider/combiner device 156. The return flow from both flow divider-combiner devices 154, 156 combines at the dual pump inlet in the common fluid line or port 216 at a common fluid pressure.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
    a chassis having first and second opposite sides extending between third and fourth opposite sides;
    first and second wheels cooperating to provide a first pair of wheels positioned along the first side of the chassis;
    third and fourth wheels cooperating to provide a second pair of wheels positioned along the second side of the chassis, wherein the third wheel is arranged diagonally relative to the first wheel on the chassis, and wherein the fourth wheel is arranged diagonally relative to the second wheel on the chassis; and
    a closed loop hydraulic system comprising:
        a pump,
        first, second, third, and fourth hydraulic motors drivingly connected to the first, second, third, and fourth wheels, respectively, to rotate the associated wheel,
        a first flow divider-combiner assembly having a first port fluidly connected to the pump, a second port directly fluidly connected to the first and third hydraulic motors, and a third port directly fluidly connected to the second and fourth hydraulic motors,
        a second flow divider-combiner assembly having a first port fluidly connected to the pump, a second port directly fluidly connected to the first hydraulic motor, and a third port directly fluidly connected to the second hydraulic motor, and
        a third flow divider-combiner assembly having a first port fluidly connected to the pump, a second port directly fluidly connected to the third hydraulic motor, and a third port directly fluidly connected to the fourth hydraulic motor;
wherein the pump is configured to provide fluid flow in a first direction in the system such that fluid flows sequentially from the pump to the first assembly to the hydraulic motors to the second and third assemblies and to the pump.

2. The vehicle of claim 1 further comprising a first axle supporting the first and fourth wheels, and a second axle supporting the second and third wheels.

3. The vehicle of claim 2 wherein the first side of the chassis is a right-hand side, and the second side of the chassis is a left-hand side.

4. The vehicle of claim 2 further comprising at least one hydraulic actuator fluidly connected to another pump and configured to steer the first and fourth wheels.

5. The vehicle of claim 4 wherein the at least one hydraulic actuator is further configured to steer the second and third wheels.

6. The vehicle of claim 1 further comprising an engine drivingly connected to the pump.

7. The vehicle of claim 1 further comprising a vehicle lift component moveably connected to the chassis; and
a function manifold fluidly connected to one of the pump and another pump and having at least one hydraulic actuator configured to move the vehicle lift component relative to the chassis.

8. The vehicle of claim 1 wherein the pump is configured to provide fluid flow in a second direction in the system such that fluid flows sequentially from the pump to the second and third assemblies to the hydraulic motors to the first assembly and to the pump.

9. A hydraulic propulsion system for a vehicle comprising:
first, second, third, and fourth hydraulic motors, the first and second motors configured to be diagonally arranged relative to one another on the vehicle, the third and fourth motors configured to be diagonally arranged relative to one another on the vehicle;
a first flow divider-combiner assembly having a first port, a second port configured to be directly fluidly coupled to the first and second hydraulic motors, and a third port configured to be directly fluidly coupled to the third and fourth hydraulic motors;
a second flow divider-combiner assembly having a first port, a second port configured to be directly fluidly coupled to the first motor and a third port configured to be directly fluidly coupled to the third motor; and
a third flow divider-combiner assembly having a first port, a second port configured to be directly fluidly coupled to the second motor and a third port configured to be directly fluidly coupled to the fourth motor;
wherein the first port of the first assembly, the first port of the second assembly, and the first port of the third assembly are configured to be fluidly connected to one another;
wherein the first assembly, the second assembly, the third assembly, and the first, second, third, and fourth hydraulic motors are configured to be arranged in a closed fluid loop; and
wherein fluid in the closed fluid loop flows sequentially in a first direction from the first assembly through one of the first, second, third, and fourth hydraulic motors and to one of the second and third assemblies.

10. The system of claim 9 wherein at least one of the first, second and third assemblies comprises a flow divider-combiner valve; and wherein the system further comprises a pump configured to be arranged in the closed fluid loop, the pump configured to fluidly couple the first ports of the first, second, and third assemblies.

11. The system of claim 9 further comprising a pump positioned between and configured to fluidly couple the first assembly to the second and third assemblies via the first ports of the first, second, and third assemblies.

12. The system of claim 9 wherein at least one of the first, second and third assemblies comprises a first pump and a second pump, each pump configured to be fluidly connected on one side to the first port of the associated assembly, the first pump configured to be fluidly connected on the other side to the second port of the associated assembly, and the second pump configured to be fluidly connected on the other side to the third port of the associated assembly.

13. The system of claim 9 wherein at least one of the first, second, and third assemblies are configured for 50/50 relative flow through the second and third ports.

14. The system of claim 13 wherein the second and third assemblies are configured for unequal relative flow through the second and third ports.

15. A method of operating a hydraulic propulsion system for a vehicle, the method comprising:
dividing fluid flow using a first flow divider-combiner device such that a first portion of the fluid flow is directed from the first flow divider-combiner device directly to first and second hydraulic motors and a second portion of the fluid flow is directed from the first flow divider-combiner device directly to third and fourth hydraulic motors;
rotating first and second wheels connected to the first and second hydraulic motors, respectively using the first portion of the fluid flow, wherein the first and second wheels are positioned diagonally relative to one another on the vehicle;
rotating third and fourth wheels connected to the third and fourth hydraulic motors, respectively using the second portion of the fluid flow, wherein the third and fourth wheels are positioned diagonally relative to one another on the vehicle, and wherein the first and third wheels cooperate to provide a first pair of wheels on a left-hand side of the vehicle, and the second and fourth wheels cooperate to provide a second pair of wheels on a right-hand side of the vehicle;
combining fluid flows from the first and third hydraulic motors to the first flow divider-combiner device via a second flow divider-combiner device; and
combining fluid flows from the second and fourth hydraulic motors to the first flow divider-combiner device via a third flow divider-combiner device.

16. The method of claim 15 further comprising:
connecting first and fourth wheels on a first axle to the first and fourth hydraulic motors, respectively;
connecting second and third wheels on a second axle to the second and third hydraulic motors, respectively;
fluidly connecting the second flow divider-combiner device and the third flow divider-combiner device to the first flow divider-combiner device via at least one pump positioned therebetween, the first flow divider-combiner device positioned downstream of the at least one pump;
wherein the fluid flows from the first and third motors are combined using the second flow divider-combiner device positioned upstream of the at least one pump; and wherein the fluid flows from the second and fourth motors are combined using the third flow divider-combiner device positioned upstream of the at least one pump.

17. The method of claim 15 further comprising:
connecting first and fourth wheels on a first axle;
connecting second and third wheels on a second axle;
fluidly connecting the second flow divider-combiner device and the third flow divider-combiner device to the first flow divider-combiner device via at least one pump positioned therebetween; and
in response to varying speeds of the first, second, third, and fourth motors as the vehicle is steered, providing varying fluid flow to the first, second, third, and fourth motors via the dividing and combining steps such that the first, second, third, and fourth wheels maintain traction through a vehicle turn.

18. The method of claim 15 wherein the first flow divider-combiner device is a first pump and a second pump, the method further comprising:
connecting first and fourth wheels on a first axle;
connecting second and third wheels on a second axle;
fluidly connecting a fluid port of the first pump to the first and second hydraulic motors to direct the first portion of the fluid flow from the first pump to the first and second motors;
fluidly connecting a fluid port of the second pump to the third and fourth motors to direct the second portion of the fluid flow received from the second pump to the third and fourth motors; and
in response to varying speeds of the first, second, third, and fourth motors as the vehicle is steered, providing varying fluid flow to the first, second, third, and fourth motors via the dividing and combining steps such that the first, second, third, and fourth wheels maintain traction through a vehicle turn.

* * * * *